United States Patent
Hasegawa

(10) Patent No.: US 7,288,711 B2
(45) Date of Patent: Oct. 30, 2007

(54) CHORD PRESENTING APPARATUS AND STORAGE DEVICE STORING A CHORD PRESENTING COMPUTER PROGRAM

(75) Inventor: Yutaka Hasegawa, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 11/429,805

(22) Filed: May 8, 2006

(65) Prior Publication Data

US 2006/0201311 A1 Sep. 14, 2006

Related U.S. Application Data

(62) Division of application No. 10/244,374, filed on Sep. 16, 2002, now Pat. No. 7,109,407.

(30) Foreign Application Priority Data

Sep. 20, 2001 (JP) .............................. 2001-286034

(51) Int. Cl.
*G10H 1/38* (2006.01)
(52) U.S. Cl. ............................ 84/613; 84/637; 84/650; 84/669
(58) Field of Classification Search .................. 84/613, 84/637, 650, 669
See application file for complete search history.

(56) References Cited

U.S. PATENT DOCUMENTS 3,889,568 A 6/1975 Amaya
5,223,659 A 6/1993 Shiraki et al.
5,455,379 A 10/1995 Kim et al.

(Continued)

FOREIGN PATENT DOCUMENTS

JP 4-3196 A 1/1992

(Continued)

OTHER PUBLICATIONS

Relevant portion of International Search Report, dated May 26, 2004, issued in related European Application No. EP 02 01 9897.

(Continued)

*Primary Examiner*—Lincoln Donovan
*Assistant Examiner*—David S. Warren
(74) *Attorney, Agent, or Firm*—Rossi, Kimms & McDowell LLP

(57) ABSTRACT

CPU 31 reads out plural chord data which are stored in external storage device 34 or the like and represent a series of chords, and presents to a user the chords represented by the chord data. In presenting the chords to the user, display 21 or external displayer 53 displays chord names along with a score or a lyric, or energizes key-press lamps 14 corresponding to the chord tones constituting the chords. External storage device 34 or the like is provided with a chord conversion table for converting hard-to-play chords to easy-to-play chords. In presenting the chords, CPU 31 presents the chords converted with the use of the chord conversion table. In this case, the hard-to-play chords may be controlled rank by rank or may be designated by the user. Thus, when chords are presented to a user, the user can perform chord playing smoothly at all times even if the user is a beginner player.

14 Claims, 9 Drawing Sheets

| before conversion | after conversion |
|---|---|
| C→Dm7→F→G7 | C→(Y)→F→G7 |
| ■ ■ | ■ ■ |

U.S. PATENT DOCUMENTS

| | | |
|---|---|---|
| 5,481,066 A | 1/1996 | Kitamura |
| 5,597,971 A | 1/1997 | Saito |
| 5,639,980 A | 6/1997 | Imaizumi |
| 5,690,496 A | 11/1997 | Kennedy |
| 5,841,053 A | 11/1998 | Johnson et al. |
| 5,852,252 A | 12/1998 | Takano |
| 5,902,948 A | 5/1999 | Haruyama |
| 6,023,017 A | 2/2000 | Minowa et al. |
| 6,084,171 A | 7/2000 | Kay |
| 6,410,839 B2 | 6/2002 | Okubo et al. |
| 6,504,090 B2 | 1/2003 | Tsai et al. |

FOREIGN PATENT DOCUMENTS

| | | |
|---|---|---|
| JP | 6-308991 | 11/1994 |
| JP | 11-143465 | 5/1999 |
| JP | 2000-221969 A | 8/2000 |

OTHER PUBLICATIONS

Office Action, dated Dec. 12, 2004, issued in related European Application No. EP 02 01 9897.

FIG.5

| before conversion | after conversion |
|---|---|
| C9 | C |
| C on G | C |
| C6 | Am7 |
| C7 sus4 | Gm7 |
| CM7 | Em7 |
| Cadd9 | C |
| ⋮ | ⋮ |

| before conversion | after conversion |
|---|---|
| C→Dm7→F→G7 | C→(Y)→F→G7 |
| ⋮ | ⋮ |

FIG.9

| before conversion | after conversion | level |
|:---:|:---:|:---:|
| C9 | C | 3 |
| C on G | C | 2 |
| C6 | Am7 | 2 |
| C7 sus4 | Gm7 | 3 |
| CM7 | Em7 | 1 |
| Cadd9 | C | 1 |
| ⋮ | ⋮ | ⋮ |

CHORD PRESENTING APPARATUS AND STORAGE DEVICE STORING A CHORD PRESENTING COMPUTER PROGRAM

CROSS-REFERENCE TO RELATED APPLICATION

This is a divisional application of U.S. application Ser. No. 10/244,374 filed on Sep. 16, 2002 now U.S. Pat. No. 7,109,407.

BACKGROUND OF THE INVENTION

1. Field of the Invention

The present invention relates to a chord presenting apparatus and a chord presenting computer program for reading out plural pieces of chord information which are stored in a chord information storage device and represent a series of chords, and for presenting to a user the chords represented by the chord information.

2. Description of the Background Art

Hitherto, it is known in the art to display chord names along with a lyric in accordance with the progression of music in a karaoke apparatus so that the user can add accompaniment play tones using a musical instrument such as a guitar to the song sung by the user, as disclosed, for example, in Japanese Laid-open Patent Publication No. 06-308991/1994.

However, in the aforesaid conventional apparatus, it often happens that the displayed chord names are chords that are difficult for a beginner to play. In these cases, the user may not be able to perform chord playing smoothly, thus failing to provide good accompaniment tones.

SUMMARY OF THE INVENTION

The present invention has been made in order to cope with the aforementioned problems of the prior art, and an object thereof is to provide a chord presenting apparatus and a chord presenting computer program by which a user can perform chord playing smoothly at all times in the case of presenting chords to the user In order to achieve the aforesaid object, the present invention is characterized by the following features in a chord presenting apparatus and in a chord presenting computer program for reading out plural pieces of chord information which are stored in a chord information storage device (or a chord information memory) and represent a series of chords, and for presenting chords represented by the chord information to a user.

The first characteristic feature lies in that, with the use of a chord conversion table that stores conversion information for converting specific chords to other specific chords, a part of the plural pieces of chord information stored in the chord information storage device is converted in accordance with the conversion information stored in the chord conversion table.

In this case, the chord conversion table may store, for example, chord information representing the before-conversion chords and conversion information for converting the before-conversion chords. As the conversion information, one can adopt chord information representing the converted chords and corresponding to the chord information representing the before-conversion chords. For example, hard-to-play chords may be selected in advance as the before-conversion chords, and easy-to-play chords may be selected in advance as the converted chords. By searching for before-conversion chords stored in the chord conversion table from among the plural chords represented by the plural pieces of chord information stored in the chord information storage device, the specific chords to be converted may be detected, and the chord information representing the converted chords and corresponding to the detected chords may be output as a conversion output.

This allows that, even if the chords represented by the plural pieces of chord information stored in the chord information storage device are hard-to-play chords, the user will be presented with easy-to-play chords. As a result, the user can perform smooth chord playing.

The second characteristic feature lies in that, with the use of a chord conversion table for converting specific chords to other specific chords, a level of the chords to be converted is input, whereby the chords to be converted are detected in accordance with the input level from among the plural chords respectively represented by the plural pieces of chord information stored in the chord information storage device, and the chord information representing the detected chords is converted in accordance with the conversion information stored in the chord conversion table.

In this case as well, the chord conversion table may store, for example, chord information representing the before-conversion chords, conversion information for converting the before-conversion chords, and level information representing the levels corresponding to the degrees of difficulty of playing, in correspondence. As the conversion information, chord information representing the converted chords can be stored in correspondence with the chord information representing the before-conversion chords. For example, hard-to-play chords may be selected in advance as the before-conversion chords, and easy-to-play chords may be selected in advance as the converted chords. In this case, the level information representing the levels corresponding to the degrees of difficulty in playing the before-conversion chords may be stored.

This allows that, when the user inputs level information in accordance with the user's own level of playing, the chords represented by the plural pieces of chord information stored in the chord information storage device will be converted in accordance with the user's level of playing. Therefore, whether the user is a beginner player, an intermediate-level player, or an expert player, the user will be presented with chords suitable for the user. As a result, even if the user is a beginner player, the user can perform smooth chord playing. Also, if the user is an expert player, the user can perform chord playing having an affluent power of expression.

The third characteristic feature lies in that, with the use of a chord conversion table that stores conversion information for converting specific chords to other specific chords, chords to be converted are input from among the plural chords, whereby the input chords are detected from among the plural chords respectively represented by the plural pieces of chord information stored in the chord information storage device, and the chord information representing the detected chords is converted in accordance with the conversion information stored in the chord conversion table.

In this case as well, the chord conversion table may store, for example, chord information representing the before-conversion chords and conversion information for converting the before-conversion chords. As the conversion information, one can adopt chord information representing the converted chords and corresponding to the chord information representing the before-conversion chords. For example, hard-to-play chords may be selected in advance as the before-conversion chords, and easy-to-play chords may be selected in advance as the converted chords. Further, in this case, for the chords to be converted, all the chords represented by all the chord information stored in the chord information storage device may be presented to the user so that the user may select chords that the user wishes to convert, from among the presented chords.

This allows that the user can designate chords to be converted on the user's side. Therefore, by designating the chords that the user is not good at playing, the user will be presented with easy-to-play chords even if the chords represented by the plural pieces of chord information stored in the chord information storage device are chords that the user finds it difficult to play. As a result, the user can perform smooth chord playing.

The fourth characteristic feature lies in that, with the use of a chord conversion table that stores conversion information for converting specific chord progressions to other specific chord progressions, plural chords representing a specific chord progression are detected from among the plural pieces of chord information stored in the chord information storage device, and a part of the plural pieces of chord information representing the detected chord progression is converted in accordance with the conversion information stored in the chord conversion table.

In this case, the chord conversion table may store, for example, plural pieces of chord information representing the before-conversion chord progressions and conversion information for converting the before-conversion chord progressions. As the conversion information, one can adopt plural pieces of chord information representing the converted chord progressions and corresponding to the plural pieces of chord information representing the before-conversion chord progressions. For example, hard-to-play chord progressions may be selected in advance as the before-conversion chord progressions, and easy-to-play chord progressions may be selected in advance as the converted chord progressions. By searching for before-conversion chord progressions stored in the chord conversion table from among the plural chord progressions represented by the plural pieces of chord information stored in the chord information storage device, the specific chord progression to be converted may be detected, and the plural pieces of chord information representing the converted chord progression and corresponding to the detected chord progression may be output as a conversion output. Further, as the conversion of a chord progression, one may convert the chord progression by converting one or more of the before-conversion chords to other chords, or alternatively, one may convert the chord progression by omitting one or more of the before-conversion chords so that the preceding chord succeeds (continues) in place of the omitted chord.

This allows that, even if the chord progression represented by the plural pieces of chord information stored in the chord information storage device is a hard-to-play chord progression, the user will be presented with an easy-to-play chord progression. As a result, the user can perform smooth chord playing.

BRIEF DESCRIPTION OF THE DRAWINGS

FIG. 5 is a format diagram of a chord conversion table stored in the external storage device or the like of FIG. 1;

FIG. 9 is a format diagram of a chord conversion table according to the aforesaid second modification.

DESCRIPTION OF THE PREFERRED EMBODIMENTS

Figure 1:
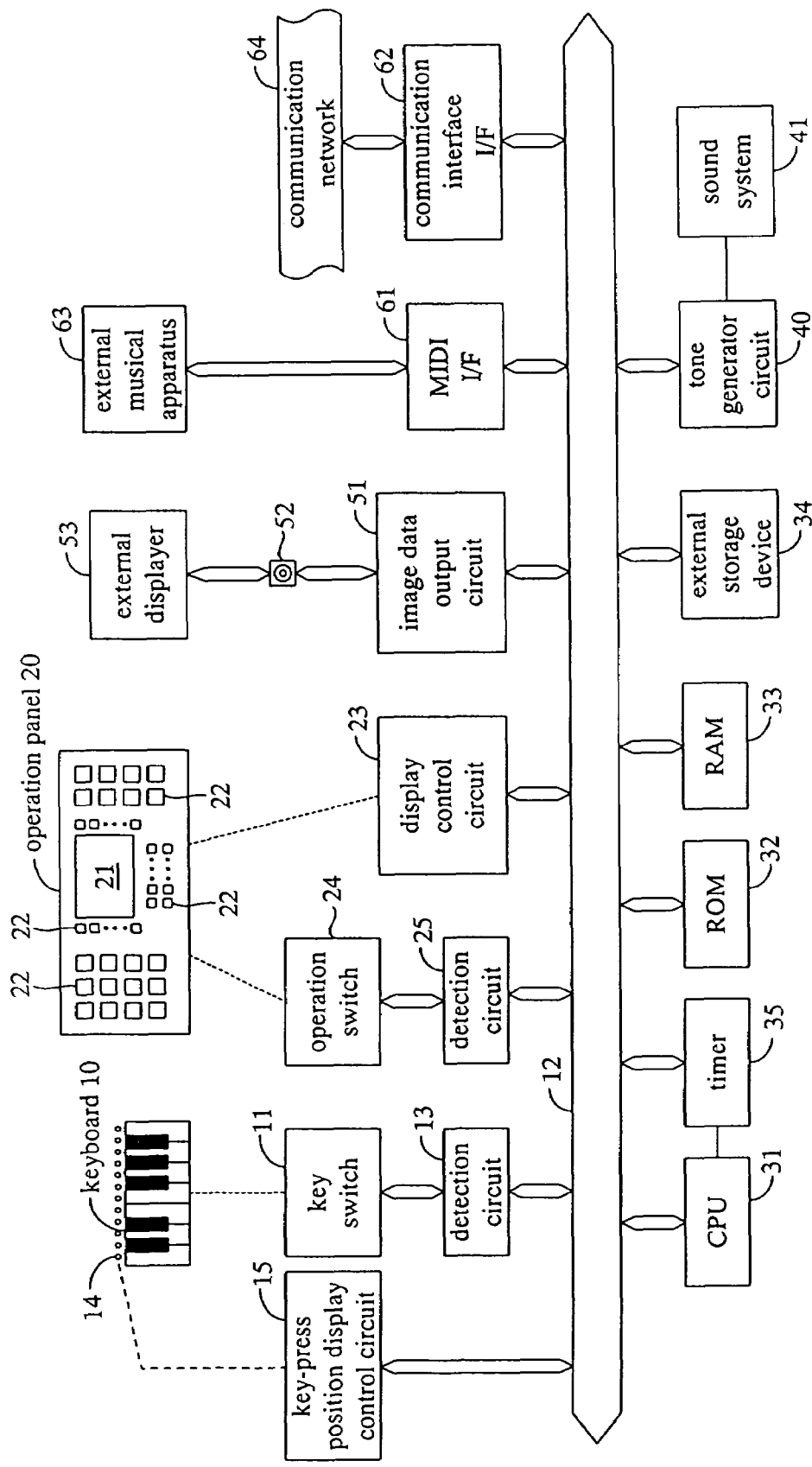
FIG. 1 is a schematic block diagram of an electronic musical instrument according to one embodiment of the present invention.

Hereafter, one embodiment of the present invention will be described with reference to the attached drawings. FIG. 1 is a block diagram illustrating an electronic musical instrument according to this embodiment.

This electronic musical instrument includes a keyboard 10 and an operation panel 20. Keyboard 10 is made of a plurality of keys as play operators, and key switches 11 disposed respectively in correspondence with the keys are turned on/off by pressing/depressing the keys. The on/off of key switches 11 is detected by a detection circuit 13 connected to a bus 12. Further, on the front side or in the rear of keyboard 10, a plurality of key-press lamps 14 are disposed on a panel (not illustrated) respectively in correspondence with the keys of keyboard 10. These key-press lamps 14 are used so as to present a key to be pressed to the user by energizing one or more of the key-press lamps 14. The energization of the key-press lamps 14 is controlled by a key-press position display control circuit 15 connected to bus 12. Here, in this embodiment, a plurality of these key-press lamps 14 are simultaneously energized and controlled for presenting a chord to the user, particularly so that a plurality of keys corresponding to the constituent tones of the chord may be pressed at the same time. Further, in the case where each key is formed of a translucent (semi-transparent) material, the key-press lamps 14 may be disposed respectively under the keys.

A display 21 and numerous control operators 22 are disposed on operation panel 20. Display 21 is constituted with a liquid crystal displayer, a cathode ray tube, or the like, and is constructed to be capable of displaying a screen for setting various modes of this electronic musical instrument including the setting of music tone elements such as a tone color, a tone volume, and an effect of the music tone signals to be generated. Display 21 is also constructed to be capable of displaying a lyric screen or a score screen representing a lyric or a score. In particular, this display 21 in this embodiment functions also as chord presenting means for presenting a chord to the user by displaying a chord name together with a lyric or a score. Display of display 21 is controlled by a display control circuit 23 connected to bus 12.

Control operators 22 are for controlling the operation of this electronic musical instrument, and operator switches 24 respectively corresponding to control operators 22 are turned on/off by operation of control operators 22. The on/off of operator switches 24 is detected by a detection circuit 25 connected to bus 12.

A CPU 31, a ROM 32, a RAM 33, an external storage device 34, a timer 35, and a tone generator circuit 40 are connected to bus 12. CPU 31, ROM 32, RAM 33, and timer 35 constitute a main body part of a micro computer, and controls various operations of this electronic musical instrument by execution of a program. External storage device 34 includes various recording media such as a hard disk HD incorporated in advance in this electronic musical instrument, or a compact disk CD or flexible disk FD mountable on this electronic musical instrument, as well as a drive unit for each of the recording media. External storage device 34 can store and read out a large amount of data and programs.

Figure 2:
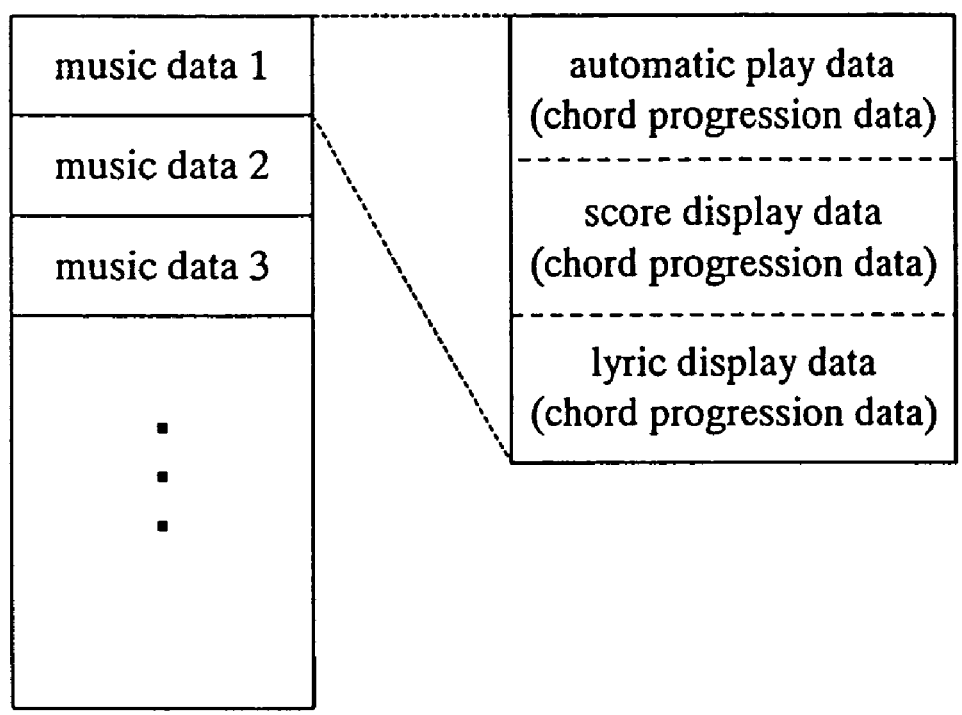
FIG. 2 is a format diagram of music data stored in an external storage device or the like of FIG. 1.
Figure 3:
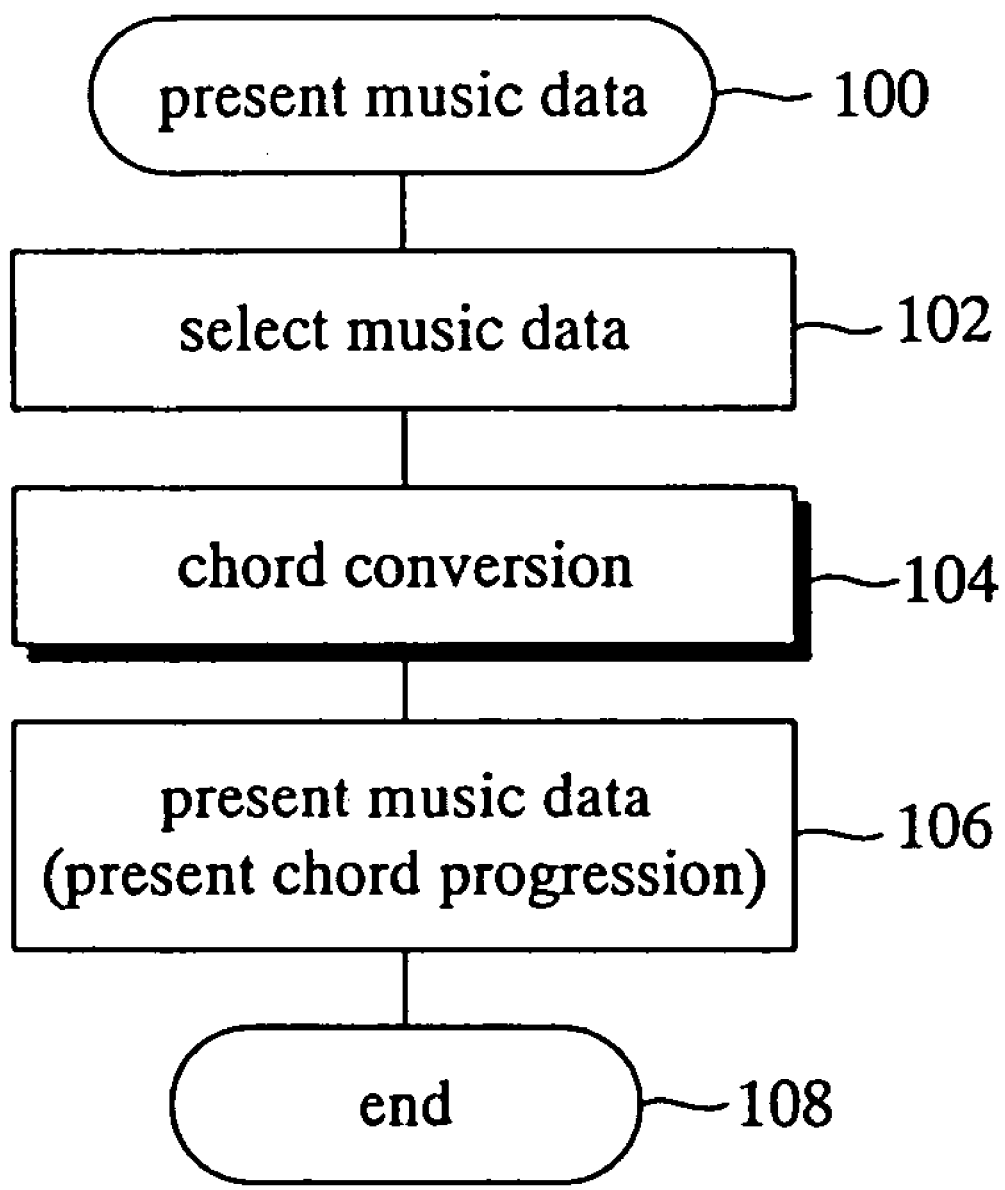
FIG. 3 is a flowchart of a music data presenting program executed by the CPU of FIG. 1.

In this embodiment, hard disk HD stores plural music data shown in FIG. 2, a music data presenting program shown in FIG. 3 (including a chord converting routine of FIG. 4), and a chord conversion table of FIG. 5. These music data, music data presenting program, and chord conversion table are supplied to hard disk HD from compact disk CD or flexible disk FD, or are supplied to hard disk HD from a later-described external music apparatus 63 or from the outside via a communication network 64.

Referring to FIG. 2, each of the music data includes an automatic play data, a score displaying data, and a lyric displaying data. The automatic play data is used for generating tone signals by being supplied to tone generator circuit 40 or external music apparatus 63, or is used for displaying the keys to be pressed by the key-press lamps 14 by being supplied to key-press position display control circuit 15. This automatic play data is made of an initial data for determining the tone color of the tone signals to be generated, the reproduction tempo of the music, and others, as well as a series of play event data, a series of timing data and end data, and others. The play event data represents a play event of the musical instrument that follows the progression of the music, and is made, for example, of a key-on or key-off data representing the pressing or depressing of a key, a note number data representing the pressed or depressed key (tone pitch), and a velocity data representing the speed of pressing the key (tone volume). The timing data represents a period of time between the play events. The end data represents the end of the music.

Further, in this play data, a plurality of chord data respectively representing plural chords that follow the progression of the music are included as play events. In this case, the chord data may be a plurality of note number data respectively representing the plural constituent tones that constitute the chord or may be a chord name data representing the chord name itself. Here, in the case of using the chord name data for generating chord tones and displaying the keys to be pressed, the chord name data is used by being converted to each of the constituent tones of the chord represented by the chord name data.

The score displaying data and the lyric displaying data are for respectively displaying a score or a lyric in accordance with the progression of one piece of music on display 21 or a later-mentioned external displayer 53. In this case as well, the chord name data representing the chord names themselves are included both in the score displaying data and in the lyric displaying data so that the chord names may be displayed in addition to the score and the lyric in displaying the score and the lyric.

The music data presenting program of FIG. 3 is a generic basis of the programs for presenting chords to the user according to the present invention, and is made, for example, of an automatic play program, a key-press position displaying program, a score displaying program, a lyric displaying program, and others.

The chord conversion table of FIG. 5 stores a plurality of before-conversion chords to be converted as well as the converted chords corresponding to the before-conversion chords. In this case, the before-conversion chords are highly difficult chords that the beginner finds it hard to play (including being hard to understand or being unfamiliar), and the converted chords are less difficult chords that the beginner finds it easier to play (including being easy to understand or being familiar).

A rule that determines the chords before and after conversion will be described. For example, a chord with a tension (for example, C9) will be converted to a chord without a tension (for example, C). A chord with an on-base (for example, C on G) will be converted to a chord without an on-base (for example, C). A hard-to-understand or unfamiliar chord (for example, C6) will be converted to another easy-to-understand or familiar chord having the same constituent tones (for example, Am7). A hard-to-understand or unfamiliar chord (for example, C7sus4) will be converted to another easy-to-understand or familiar chord (for example, Gm7) made of nearby constituent tones. A hard-to-understand or unfamiliar chord (for example, CM7) will be converted to another easy-to-understand or familiar chord (for example, Em7) having the same function (tonic T, dominant D, subdominant S). A chord with an added tone (Cadd9) will be converted to a chord (C) without an added tone.

Tone generator circuit 40 generates tone signals in accordance with play information (key-on signal, key-off signal, note number, velocity, etc.) from CPU 31. In generation of the tone signals, tone generator circuit 40 also controls the music tone elements such as the tone color, tone volume (amplitude envelope), and effect of the tone signals in accordance with the music tone element control data supplied from CPU 31 for controlling the music tone elements. The tone signals generated in tone generator circuit 40 are output to a sound system 41. Sound system 41 is made of amplifiers, speakers, and others, so as to generate the music sounds corresponding to the output tone signals.

Further, an image data output circuit 51, a MIDI interface circuit 61, and a communication interface circuit 62 are connected to bus 12. Image data output circuit 51 outputs lyric displaying data, score displaying data, and others to external displayer 53 via its output terminal 52. External displayer 53 is constituted with a CRT display, a liquid crystal displayer, or the like having a larger size than the display 21, and displays a lyric or score in the same manner as the display 21.

MIDI interface circuit 61 is for communicating data related to music such as the aforesaid automatic play data, lyric displaying data, and score displaying data with external music apparatus 63 connected to the interface circuit 61. Communication interface circuit 62 is connectable to the outside via a communication network 64 so that this electronic musical instrument can communicate various programs and data with the outside.

Next, an operation of the embodiment constructed as shown above will be described. First, a user gives an instruction for execution of the music data presenting program by operating any of control operators 22 after turning on the power switch (not illustrated) of the electronic musical instrument. This allows that, by execution of a program (not illustrated) stored in ROM 32, CPU 31 reads out the music data presenting program of FIG. 3 (including the chord converting routine of FIG. 4) and the chord conversion table of FIG. 5 from hard disk HD of external storage device 34, for storage into RAM 33.

Here, if the music data presenting program and the chord conversion table are not stored in hard disk HD, a music data presenting program and a chord conversion table stored in compact disk CD, flexible disk FD, or the like will be stored into hard disk HD, or a music data presenting program and a chord conversion table will be downloaded into hard disk HD from external music apparatus 63 or from the outside via communication network 64, and thereafter the music data presenting program and chord conversion table will be transferred to RAM 33 and started. Further, a part of the music data presenting program and the chord conversion table may remain stored in hard disk HD or other recording media without being stored into RAM 33, in accordance with the needs.

The music data presenting program is started at step 100 of FIG. 3. After this program is started, CPU 31 at step 102 prompts the user to select music by controlling display control circuit 23 to display a message for selection of the music on display 21. When the user selects a desired piece of music by operation of control operators 22, CPU 31 reads out the selected music data from the hard disk of external storage device 34 for writing into RAM 33. In this case as well, if the desired music data is not stored in hard disk HD, music data stored in compact disk CD, flexible disk FD, or the like will be stored into hard disk HD, or music data will be downloaded into hard disk HD from external music apparatus 63 or from the outside via communication network 64, and thereafter, the music data will be transferred to RAM 33. Here, the music data written into RAM 33 may be only one kind of data instead of all the kinds of data including the automatic play data, the score displaying data, and the lyric displaying data, in accordance with the purpose of its use.

After the process of step 102, CPU 31 executes the chord converting routine at step 104. This chord converting routine is described in detail in FIG. 4, and is started at step 200. After the execution of this chord converting routine is started, CPU 31 at step 202 lets an address pointer proceed from the head address position of the music data transferred to RAM 33, so as to search for the first chord data in the music data, and then sets the address pointer at the address position of the first chord data. Next, CPU 31 at step 204 searches into the before-conversion data in the chord conversion table transferred to RAM 33 to find the chord data designated by the address pointer. Then, CPU 31 at step 206 determines whether a chord data that coincides with the chord data designated by the address pointer has been found in the before-conversion chord data in the chord conversion table.

If it is determined as "YES" at step 206, i.e. if it is determined that the coincident chord data is present in the before-conversion chord data of the chord conversion table, CPU 31 proceeds to step 208. At step 208, the converted chord data stored in the chord conversion table and corresponding to the coincident before-conversion chord data is read out. Then, the chord data in the music data indicated by the address pointer is changed to the converted chord data that has been read out from the chord conversion table. Thereafter, CPU 31 at step 210 lets the address pointer proceed so as to search for the next chord data in the music data, and sets the address pointer at the address position of the next chord data.

On the other hand, if it is determined as "NO" at step 206, i.e. if it is determined that the coincident chord data is not present in the before-conversion chord data of the chord conversion table, CPU 31 proceeds directly to step 210 without executing the process of step 208. In this case, therefore, the chord data in the music data remains unchanged.

After the process of step 210, CPU 31 at step 212 determines whether the address pointer has reached the last data position of the music data. If the address pointer has not reached the last data position of the music data yet, CPU 31 at step 212 determines as "NO" and returns to step 204. In this case, the processes of steps 204 to 210 are executed again. Namely, if a chord data that coincides with the chord data designated by the address pointer is found in the before-conversion chord data of the chord conversion table, the chord data designated by the address pointer is changed to the converted chord data stored in the chord conversion table and corresponding to the before-conversion chord data.

When the address pointer reaches the last data position of the music data through these repeated processes of steps 204 to 212, CPU 31 at step 212 determines as "YES", and the execution of this chord converting routine is ended at step 214.

Returning to the description of the music data presenting program of FIG. 3, after executing the chord converting routine of step 104, CPU 31 executes the process of step 106. In this step 106, the music data is presented to the user, namely, the play information represented by the music data including the chords represented by the converted chord data is presented to the user. When the presentation of the music data to the user is finished, the execution of the music data presenting program is ended at step 108.

This presentation of the music data will be described more specifically. If the music data presenting program of FIG. 3 is the aforementioned automatic play program, a series of play event data including the converted chord data are supplied to tone generator circuit 40 or external music apparatus 63 at each time interval designated by the timing data. Tone generator circuit 40 or external music apparatus 63 generates tone signals (including chord tone signals) corresponding to the series of play event data including the converted chord data with a tone color designated by the separately transferred data for controlling the tone color or the like. Therefore, in this case, the presentation of music data including the presentation of chords to the user means an auditory presentation of the automatic play sounds including the chord tones to the user.

If the music data presenting program of FIG. 3 is the aforementioned key-press position displaying program, a series of play event data including the converted chord data are supplied to key-press position display control circuit 15 at each time interval designated by the timing data. Key-press position display control circuit 15 energizes key-press lamps 14 disposed at the key positions corresponding to the tone pitches represented by the series of play event data including the converted chord data. In this case, with regard to the chord data, key-press lamps 14 disposed at the key positions corresponding to the tone pitches of the tones constituting the chord represented by the chord data are energized. Therefore, in this case, the presentation of the chords to the user means sequential visual presentation of the tone pitch positions of the tones constituting the chord to the user.

If the music data presenting program of FIG. 3 is a score displaying program or lyric displaying program, the score displaying data or lyric displaying data are supplied to display control circuit 23 or image data output circuit 51 as the music data. On the basis of the supplied score display data or lyric display data, display control circuit 23 or image data output circuit 51 displays a score or lyric represented by the score display data or lyric display data on display 21 or external displayer 53. In this case, with regard to the score or lyric to be displayed, a whole of one piece of music may be displayed, or alternatively, a part corresponding to one chorus or one phrase, or even a part corresponding to the predetermined bars may be displayed. Here, if only a part of the music is displayed, the displayed part may be changed in accordance with the progression of the music.

In this case, the score display data or lyric display data includes the chord data, and this chord data is one already converted by the aforesaid chord conversion in accordance with the conversion information of the chord conversion table. Generally, the chord names represented by the chord data are displayed in accordance with the progression of the score or lyric. In this case, therefore, the presentation of the chords to the user means visual presentation of the chord names to the user. Further, in the case of displaying a score, the chords may be presented to the user by displaying the chords with the use of plural music notes on the score instead of the chord names.

As will be understood from the above description of the operation, this allows that, even if a chord data representing a highly difficult chord is included in the music data (automatic play data, score display data, and lyric display data), the chord data is presented to the user by being converted to a chord data representing a less difficult chord with the use of the chord conversion table. As a result of this, the user can perform smooth chord playing.

Here, in the above-described embodiment, among the plural chords represented by the chord data in the music data, all of the chords registered as before-conversion chords in the chord conversion table are converted to less difficult chords. However, in lieu of this, the user may be allowed to select whether or not to perform chord conversion with the use of the chord conversion table. In this case, in the music data presenting program of FIG. 3, a process of letting the user select whether or not to execute the chord converting routine of step 104 may be inserted between step 102 and step 104 so that the chord converting routine may be executed only when the user wishes so and, in other cases, the chord converting routine may not be executed. This allows that, if the user wishes to play all of the presented chords such as in the case where the user is an expert player who can play highly difficult chords, all the chords represented by the chord data included in the music data will be played by the user. As a result of this, according to this modification, music sounds including the highly difficult chords are generated, whereby one can enjoy music having an affluent power of expression in playing.

Alternatively, plural kinds of chord conversion tables may be prepared as described above so that the plural kinds of chord conversion tables may be used in accordance with a selection of the user. In this case, in the prepared plural kinds of chord conversion tables, before-conversion chords are registered in accordance with levels of playing. For example, one may prepare a chord conversion table in which even the chords having a lower degree of difficulty than an intermediate level are registered as the before-conversion chords, a chord conversion table in which the chords having a higher degree of difficulty than the intermediate level are registered as the before-conversion chords, and a chord conversion table in which only the chords having an extremely high degree of difficulty are registered as the before-conversion chords. Then, in the music data presenting program of FIG. 3, a process of inputting information representing a primary level, an intermediate level, an advanced level, or the like may be inserted between step 102 and step 104 so that a chord conversion table to be used in the chord converting routine of step 104 may be selected by this input information, or alternatively non-execution of the chord conversion may be selected.

Next, the first to third modifications will be sequentially described in which the mode of chord conversion in the above embodiment is changed.

a. First Modification

Figure 4:
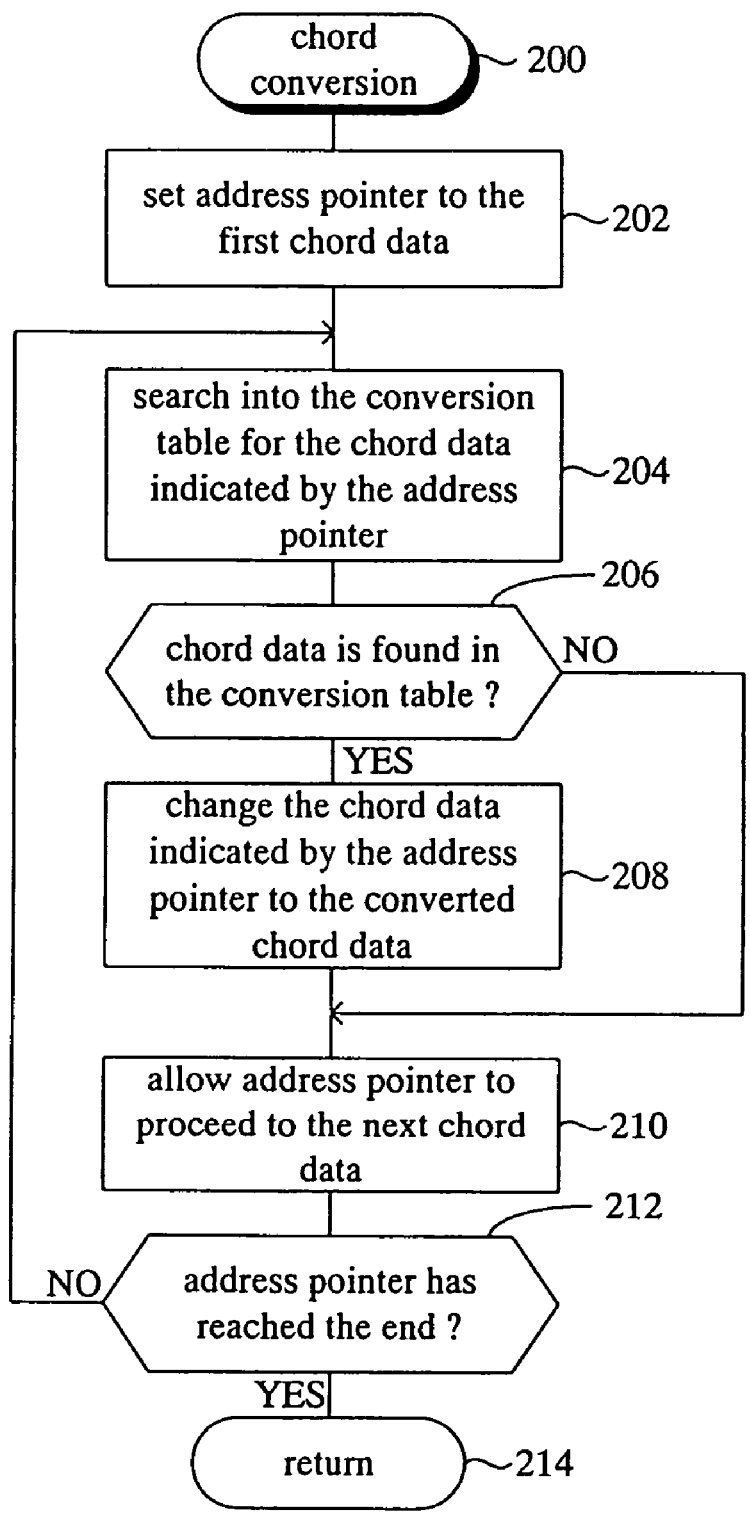
FIG. 4 is a flowchart showing details of the chord converting routine of FIG. 3.
Figures 6, 7:
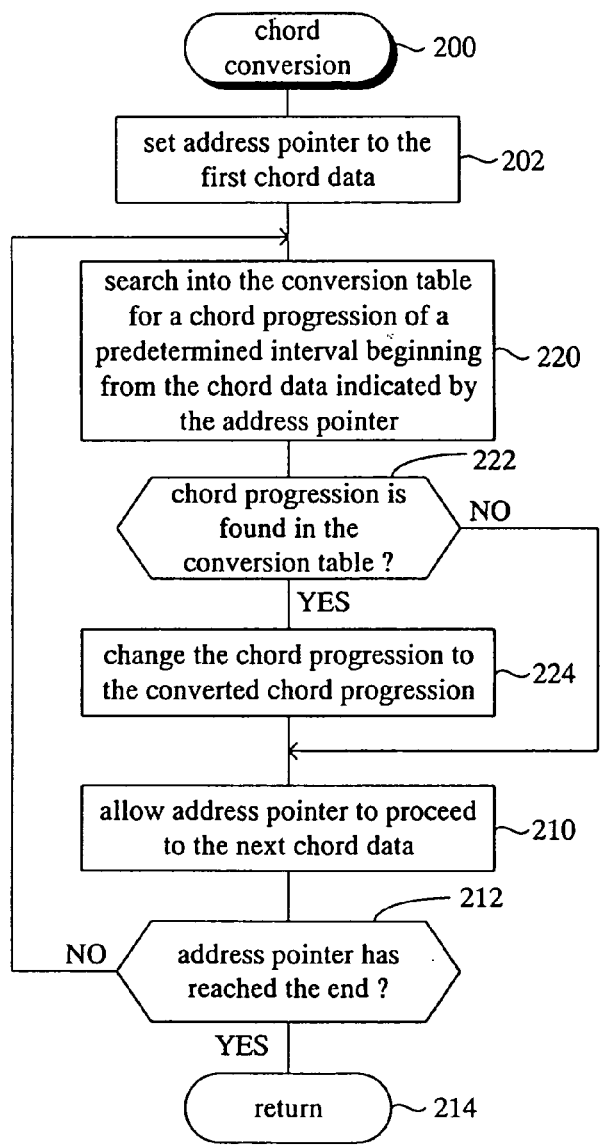
FIG. 6 is a flowchart showing details of a chord converting routine according to the first modification of the aforesaid embodiment.
FIG. 7 is a format diagram of a chord conversion table according to the aforesaid first modification.

In this first modification, the chord converting routine of FIG. 4 is modified as shown in FIG. 6, and the chord conversion table of FIG. 5 is changed as shown in FIG. 7. This chord conversion table stores before-conversion chord progressions and converted chord progressions in correspondence. A chord progression is a short chord progression of a predetermined interval such as two bars or of a predetermined number such as four bars. In this case as well, the before-conversion chord progressions are made of highly difficult chords that the beginner finds it hard to play (including being hard to understand or being unfamiliar), and the converted chord progressions are made of less difficult chords that the beginner finds it easier to play (including being easy to understand or being familiar). An example of the before-conversion chord progressions is C-Dm7-F-G7, and an example of the converted chord progressions is C-(Y)-F-G7. Here, (Y) may be the same chord as the previous chord (chord C), or may be another chord. In essence, it suffices if the before-conversion chords and the converted chords are partly different. The other constituents of this modification are the same as in the aforesaid embodiment.

In this first modification constructed as shown above, the chord converting routine shown in FIG. 6 is executed at step 104 of FIG. 3 in the aforesaid embodiment. In this chord converting routine, after the processes of steps 200, 202 similar to those in the aforesaid embodiment, CPU 31 at step 220 reads out plural chord data of a predetermined interval (or of a predetermined number) from the chord data designated by the address pointer in the music data, and searches into the before-conversion chord progression data of the chord conversion table to find a chord progression made of the plural chord data. Then, CPU 31 at step 222 determines whether a chord progression that coincides with the chord progression in the music data has been found in the before-conversion chord progression data of the chord conversion table.

If it is determined as "YES" at step 222, i.e. if it is determined that the coincident chord progression is present in the before-conversion chord progression data of the chord conversion table, CPU 31 proceeds to step 224. At step 224, the plural chord data stored in the chord conversion table and representing the converted chord progression corresponding to the coincident before-conversion chord progression is read out. Then, the plural chords in the music data corresponding to the coincident chord progression are changed to the plural chord data representing the converted chord progression read out from the chord conversion table. On the other hand, if it is determined as "NO" at step 222, i.e. if it is determined that the coincident chord progression is not present in the before-conversion chord progression data of the chord conversion table, CPU 31 proceeds directly to step S210 without executing the process of step 224. In this case, therefore, the chord progression data in the music data, i.e. the plural chord data, remain unchanged.

The processes of step 210 and afterwards are the same as in the aforesaid embodiment. After the process of step 222 or 224, CPU 31 at step 210 lets the address pointer proceed to the address position of the next chord data in the music data, and executes the determining process of step 212 similar to that of the aforesaid embodiment, i.e. the process of determining whether the address pointer has reached the last data position of the music data. If the address pointer has not reached the last data position of the music data yet, CPU 31 at step 212 determines as "NO" and returns to step 220 to execute the circulation process of steps 220 to 212. On the other hand, if it is determined that the address pointer has reached the last data position of the music data, CPU 31 at step 212 determines as "YES", and the execution of this converting routine is ended for a while at step 214.

Therefore, according to this modification, even if a chord data representing a highly difficult chord progression is included in the music data (automatic play data, score display data, and lyric display data), the chord data is presented to the user by being converted to a chord data representing a less difficult chord progression with the use of the chord conversion table. As a result of this, the user can perform smooth chord playing.

Here, in the above-described embodiment, among the plural chord progressions each represented by the plural chord data in the music data, all of the chord progressions registered as before-conversion chord progressions in the chord conversion table are converted to less difficult chord progressions. However, in lieu of this, the user may be allowed to select whether or not to perform chord conversion with the use of the chord conversion table. In this case as well, in the music data presenting program of FIG. 3, a process of letting the user select whether or not to execute the chord converting routine of step 104 may be inserted between step 102 and step 104 so that the chord converting routine may be executed only when the user wishes so and, in other cases, the chord converting routine may not be executed. This allows that, if the user wishes to play all of the presented chord progressions such as in the case where the user is an expert player who can play highly difficult chord progressions, all the chord progressions represented by the chord data included in the music data are played by the user. As a result of this, according to this modification, music sounds including the highly difficult chord progressions are generated, whereby one can enjoy music having an affluent power of expression in playing.

Alternatively, plural kinds of chord conversion tables may be prepared as described above so that the plural kinds of chord conversion tables may be used in accordance with a selection of the user. In this case, in the prepared plural kinds of chord conversion tables, before-conversion chord progressions are registered in accordance with levels of playing. For example, one may prepare a chord conversion table in which even the chord progressions having a lower degree of difficulty than an intermediate level are registered as the before-conversion chord progressions, a chord conversion table in which the chord progressions having a higher degree of difficulty than the intermediate level are registered as the before-conversion chord progressions, and a chord conversion table in which only the chord progressions having an extremely high degree of difficulty are registered as the before conversion chord progressions. In this case as well, in the music data presenting program of FIG. 3, a process of inputting information representing a primary level, an intermediate level, an advanced level, or the like may be inserted between step 102 and step 104 so that a chord conversion table to be used in the chord converting routine of step 104 may be selected by this input information, or alternatively non-execution of the chord conversion may be selected.

b. Second Modification

Figure 8:
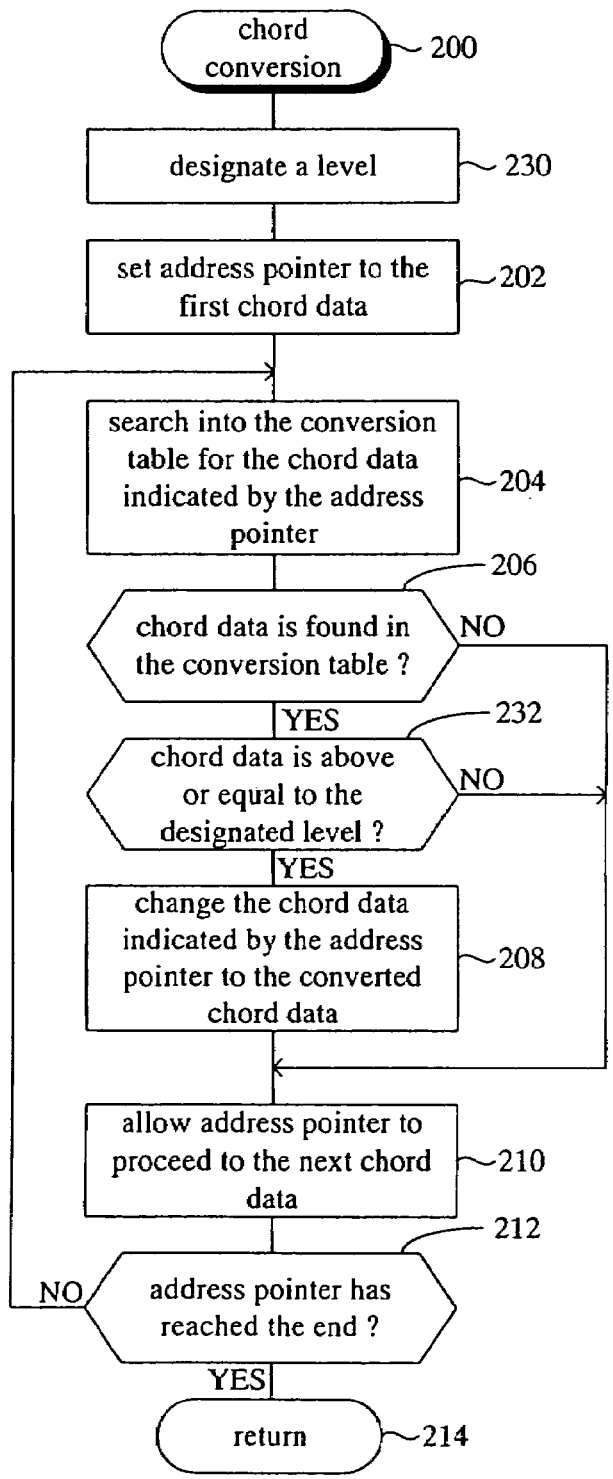
FIG. 8 is a flowchart showing details of a chord converting routine according to the second modification of the aforesaid embodiment.

Next, the second modification will be described. In this modification, the chord converting routine of FIG. 4 is modified as shown in FIG. 8, and the chord conversion table of FIG. 5 is modified as shown in FIG. 9. This chord conversion table stores level data representing the degrees of difficulty (for example, levels 1, 2, and 3) of the before-conversion chords in correspondence with the before-conversion chords and the converted chords of FIG. 4.

In the second modification constructed as described above, the chord converting routine shown in FIG. 8 is executed at step 104 of FIG. 3 in the aforementioned embodiment. In this chord converting routine, after the start of step 200, CPU 31 at step 230 prompts the user to input a level data representing a degree of difficulty by displaying on display 21 a message for selection of the level data representing the degree of difficulty of the chords to be converted. When the user inputs a level data representing a degree of difficulty of the chords to be converted with the use of control operators 22 in response to this, CPU 31 takes in the input level data. Then, after setting the address pointer at the address position of the first chord data in the music data at step 202 in the same manner as in the aforementioned embodiment, CPU 31 executes the circulation process of steps 204 to 212.

This circulation process is different from that of the aforementioned embodiment in that a determining process of step 232 is inserted between steps 206 and 208, but the other constituents are the same. In this step 232, if it is determined as "YES" at step 206, i.e. if a chord data corresponding to the chord data indicated by the address pointer is present in the conversion table, CPU 31 determines whether or not the level data stored in the conversion table and corresponding to the chord data is above or equal to the level designated by the user. If the level data of the conversion table is above or equal to the level represented by the level data input by the user, CPU 31 determines as "YES" at step 232, and changes the chord data indicated by the address pointer to the converted chord data in the chord conversion table at step 208. On the other hand, if the level data in the chord conversion table is below the level represented by the level data input by the user, CPU 31 determines as "NO" at step 232 and executes the process of step 210 to let the address pointer proceed.

Therefore, according to this second modification, when the user inputs level information in accordance with the user's own level of playing, the chords represented by the chord data in the music data will be converted in accordance with the user's level of playing. Therefore, whether the user is a beginner player, an intermediate-level player, or an expert player, the user will be presented with chords suitable for the user. As a result, even if the user is a beginner player, the user can perform smooth chord playing. Also, if the user is an expert player, the user can perform chord playing having an affluent power of expression.

Further, in this second modification as well, in the music data presenting program of FIG. 3, the process of letting the user select whether or not to execute the chord converting routine of step 104 may be inserted between step 102 and step 104 so that the chord converting routine may be executed only when the user wishes so, and, in other cases, the chord converting routine may not be executed. This allows that, if the user wishes to play all of the presented chords such as in the case where the user is an expert player who can play highly difficult chords, all the chords represented by the chord data included in the music data will be played by the user.

c. Third Modification

Next, the third modification will be described. In this modification, the chord converting routine of FIG. 4 is modified as shown in FIG. 10.

Figure 10:
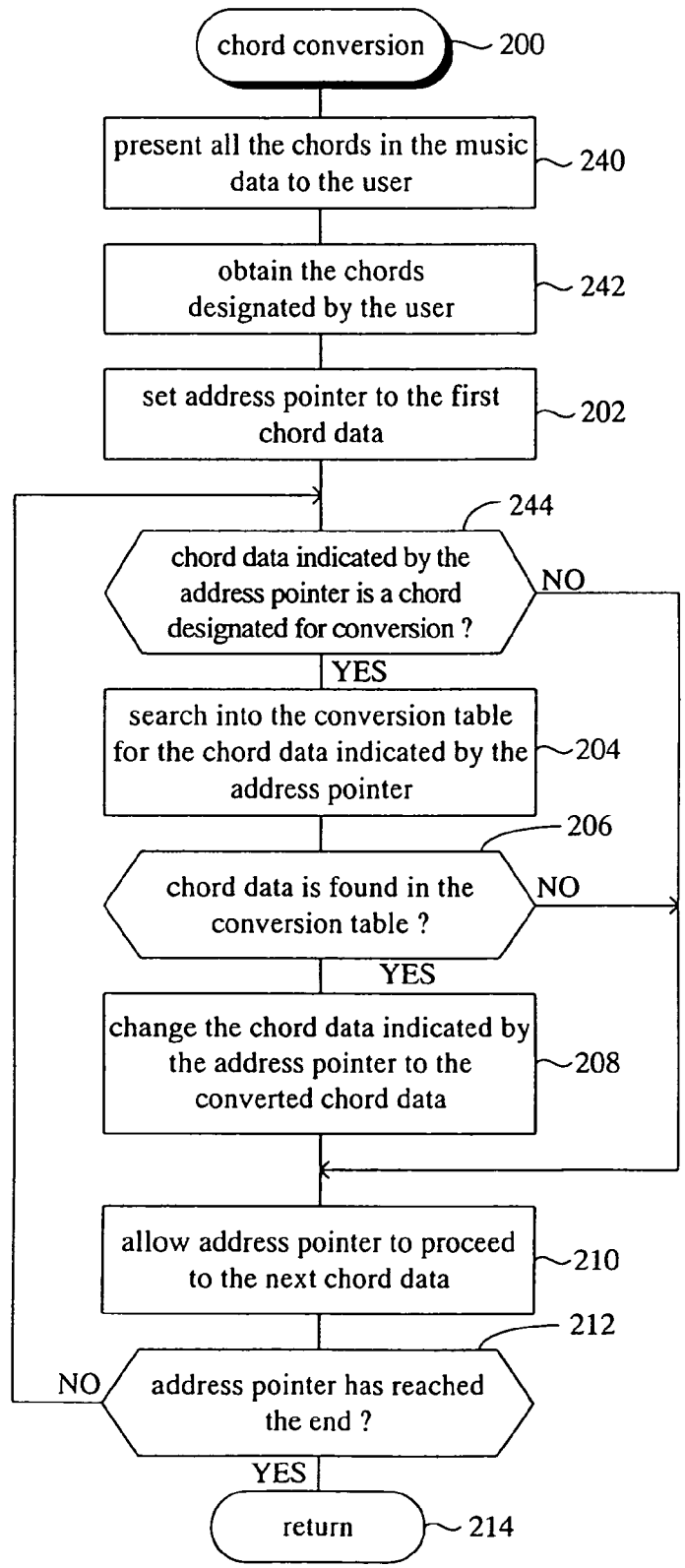
FIG. 10 is a flowchart showing details of a chord converting routine according to the third modification of the aforesaid embodiment.

In this third modification, the chord converting routine shown in FIG. 10 is executed at step 104 of FIG. 3 in the aforementioned embodiment. In this chord converting routine, after the start of step 200, CPU at 240 reads out all of the chord data from among the selected music data, and displays the chords represented by the chord data on display 21. In the chord display of this case, a chord name may be displayed, or alternatively, chord tones constituting the chord may be displayed with the use of plural music notes on a score. When the user designates, namely inputs, the chords that the user wishes to convert in response to this display, CPU 31 at step 242 obtains the designated chords for storage into RAM 33. Then, at step 202 similar to that of the aforementioned embodiment, CPU 31 sets the address pointer at the address position of the first chord data in the music data, and repeatedly executes the circulation process made of steps 244 to 212.

This circulation process is different from that of the aforementioned embodiment in that the process of step 244 is added to the processes of steps 204 to 212 similar to those of the aforementioned embodiment, but the other constituents are the same. At this step 244, CPU 31 determines whether or not a chord data coincident with the chord data located at the address position indicated by the address pointer is present in the chord data stored in advance in RAM 33 by the process of step 242. If the coincident chord data is absent, CPU 31 determines as "NO" at step 244, and proceeds to step 210 to let the address pointer proceed to the address position of the next chord data. On the other hand, if the coincident chord data is present, CPU 31 determines as "YES" at step 244 and converts or does not convert the chord data indicated by the address pointer to other chord data in accordance with the contents stored in the chord conversion table by the processes of steps 204 to 208 similar to those of the aforementioned embodiment.

When the conversion process on all of the chord data in the music data is finished by the circulation process made of these steps 244 to 212, CPU 31 at step 212 determines as "YES", i.e. determines that the address pointer has reached the end of the music data, and ends the execution of this chord converting routine at step 214.

Therefore, according to this third modification, the user can designate chords to be converted on the user's side. Therefore, by designating the chords that the user is not good at playing, the user will be presented with easy-to-play chords even if the chords represented by the chord data in the music data are chords that the user finds it difficult to play. As a result, the user can perform smooth chord playing.

Here, in this third modification, as the chord conversion table, the same table as that of the aforementioned embodiment may be used; however, since it is expected that the types of the chords that the user wishes to convert may vary depending on the user, numeral types of the chords may be preferably stored as the before-conversion chords in the chord conversion table.

Further, in this third modification as well, whether or not to perform the chord conversion may be made selectable. In this case as well, in the music data presenting program of FIG. 3, the process of letting the user select whether or not to execute the chord converting routine of step 104 may be inserted between step 102 and step 104 so that the chord converting routine may be executed only when the user wishes so, and, in other cases, the chord converting routine may not be executed. This allows that the user who does not wish to perform chord conversion can avoid performing unnecessary procedures for the chord conversion.

d. Other Modifications

In the above-described second modification, the user is allowed to designate a level of the chords to be converted, while in the above-described third modification, the user is allowed to designate the chords themselves that the user wishes to convert. However, the level designation of the chords may be applied to the conversion of chord progressions according to the above-described first modification. In this case, the processes of designating a level of the chord progressions and of determining the coincidence of the chord progressions corresponding to the designated level, such as the processes of steps 230 and 232 of the chord converting routine of FIG. 8, may be added to the chord converting routine of FIG. 6 so that the chord progressions corresponding to the user's level may be changed to easy-to-play chord progressions with the use of the chord conversion table of FIG. 7 for converting the chord progressions.

This allows that, when the user inputs level information in accordance with the user's own level of playing, the chord progressions appearing in the music data will be converted in accordance with the user's level of playing. Therefore, whether the user is a beginner player, an intermediate-level player, or an expert player, the user will be presented with chord progressions suitable for the user.

Further, the aforesaid designation of the chords themselves may also be applied to the conversion of chord progressions according to the above-described first modification. In this case, the processes of designating the chord progressions that the user wishes to convert and of determining the coincidence of the designated chord progressions, such as the processes of steps 240 to 244 of the chord converting routine of FIG. 10, may be added to the chord converting routine of FIG. 6 so that the specific chord progressions designated by the user may be changed to other easy-to-play chord progressions with the use of the chord conversion table of FIG. 7 for converting the chord progressions.

This allows that, when the user inputs chord progressions that the user wishes to convert, the input chord progressions appearing in the music data will be converted to easy-to-play chord progressions. Therefore, the user will be presented with chord progressions suitable for the user in accordance with the wish of the user. As a result of this, according to these modifications as well, even if the user is a beginner player, the user can perform smooth chord playing. Also, if the user is an expert player, the user can perform chord playing having an affluent power of expression.

Further, in the aforesaid chord conversion tables of FIGS. 5 and 9, converted chord names are stored as chord conversion information. However, regarding the converted chords, information that can define the converted chords with the use of information concerning the before-conversion chords, such as storing only chord types in the case where the root tones are the same, may be stored as the chord conversion information. Also, in a chord conversion table showing chord progressions such as shown in FIG. 7, any information may be adopted as the chord conversion information as long as the information shows before-conversion chords to be converted in a before-conversion chord series together with the converted chords corresponding to the before-conversion chords. Furthermore, in the aforementioned embodiment, the chords in the music data and the chords in the chord conversion table are expressed with the use of root tones and chord types. However, if the musical key is known, the chords may be expressed with the use of degrees (for example, I for C, IIm for Am, and the like).

In addition, in the above-described embodiment and various modifications, those having chord data as a part of the music data made of automatic play data, score display data, or lyric display data have been described; however, the present invention can be applied to those storing only a plurality of chord data.

Further, the aforementioned embodiment has been described raising an example in which the present invention is applied to an electronic musical instrument having keyboard 10 as play operators; however, the present invention can be applied to various musical instruments having a touch plate, press-buttons, strings, or the like as the play operators. In addition, besides electronic musical instruments, the present invention can be applied to various electronic apparatus such as a computer unit if the electronic apparatus include a device for generating chord tone signals and a device capable of presenting chords to a user, such as a displayer capable of displaying chord names, scores, and others.

Further, in carrying out the present invention, it is not limited to the aforesaid embodiment and modifications thereof, so that various modifications can be made as long as they do not depart from the object of the present invention.

What is claimed is:

1. A chord presenting apparatus comprising:
   a chord information storage device for storing plural pieces of chord information which represent a series of chords;
   a chord presenting device for reading out chord information stored in said chord information storage device and for presenting chords represented by the chord information to a user;
   a chord conversion table that stores conversion information for converting a first chord progression to a second chord progression;
   a chord detector that searches and detects plural pieces of chord information, representing the first chord progression from among the plural pieces of chord information stored in said chord information storage device, from the chord conversion table; and
   a chord converter that converts the plural pieces of chord information representing the first chord progression to the second chord progression in accordance with the conversion information stored in said chord conversion table, so as to supply the converted chord progression to said chord presenting device, after when a series of the plural pieces of chord information representing the entirety of the first chord progression is found in the conversion table,
   wherein said first chord progression consists of a first series of chords, and said second chord progression consists of a second series of chords, where at least one of the chords thereof is different from said first series of chords.

2. The chord presenting apparatus according to claim 1, wherein the chord presentation by said chord presenting device is at least either one of an auditory presentation for chords and a visual presentation for chords.

3. The chord presenting apparatus according to claim 1, further comprising a level input device for inputting a level of difficulty of the first chord progression, wherein the chord converter converts the chord information representing the first chord progression in accordance with the conversion information stored in said chord conversion table and the input level of difficulty to the first chord progression, so as to supply the converted chord information to said chord presenting device.

4. The chord presenting apparatus according to claim 3, wherein said chord conversion table further stores level data representing the degree of difficulty of the first chord progression.

5. The chord presenting apparatus according to claims 1, further comprising a chord progression input device for inputting the first chord progression, wherein the chord converter converts the chord information representing the first chord progression in accordance with the conversion information stored in said chord conversion table, so as to supply the converted chord information to said chord presenting device.

6. The chord presenting apparatus according to claim 5, further comprising a chord displayer for displaying the plural chords respectively represented by the plural pieces of chord information stored in said chord information storage device when the first chord progression is input by said chord progression input device.

7. A computable-readable storage medium storing a chord presenting computer program for reading out plural pieces of chord information which are stored in a chord information storage device and represent a series of chords, and for presenting chords represented by the chord information to a user, the computer program including the instructions for:
   searching and detecting plural pieces of chord information, representing a first chord progression from among the plural pieces of chord information stored in said chord information storage device, from a chord conversion table; and
   converting the plural pieces of chord information representing said first chord progression to the second chord progression in accordance with conversion information stored in the chord conversion table, so as to present the converted chord progression to the user, after when a series of the plural pieces of chord information representing the entirety of the first chord progression is found in the conversion table,
   wherein said first chord progression consists of a first series of chords, and said second chord progression consists of a second series of chords, where at least one of the chords thereof is different from said first series of chords.

8. The computer-readable storage medium storing the chord presenting computer program according to claim 7, wherein the chord presentation is at least either one of an auditory presentation for chords and a visual presentation for chords.

9. The computer-readable storage medium storing the chord presenting computer program according to claim 7, further including instruction for inputting a level of difficulty of the first chord progression, wherein said instructions for converting converts the chord information representing the first chord progression in accordance with the conversion information stored in said chord conversion table and the input level of difficulty to the first chord progression.

10. The computer-readable storage medium storing the chord presenting computer program according to claim 9, wherein said chord conversion table further stores level data representing the degree of difficulty of the first chord progression.

11. The computer-readable storage medium storing the chord presenting computer program according to claim 7, further including the instruction for inputting the first chord progression, wherein said instructions for converting converts the chord information representing the first chord progression in accordance with the conversion information stored in said chord conversion table.

12. The computer-readable storage medium storing the chord presenting apparatus according to claim 11, further including the instruction for displaying the plural chords respectively represented by the plural pieces of chord information stored in said chord information storage device when the first chord progression is input.

13. A chord presenting apparatus comprising:
- a chord information storage device for storing plural pieces of chord information which represent a series of chords;
- a chord presenting device for reading out chord information stored in the chord information storage device and for presenting chords represented by the chord information to a user;
- a chord conversion table that stores conversion information for converting a first chord progression to a second chord progression and a level data representing the degree of difficulty of the first chord progression;
- a chord detector that searches and detects plural pieces of chord information, representing the first chord progression from among the plural pieces of chord information stored in the chord information storage device, from the chord conversion table; and
- a level input device for inputting a level data representing the degree of difficulty of the first chord progression to be converted; and
- a chord converter for converting the first chord progression in the pieces of chord information stored in the chord information storage device to the second chord progression in accordance with the conversion information stored in the chord conversion table, so as to supply the converted chord information to the chord presenting device, after when a series of the plural pieces of chord information representing the entirety of the first chord progression is found in the conversion table and when the input level data is higher or equal to the level of difficulty of the first chord progression stored in the chord conversion table.

14. The computer-readable storage medium storing a chord presenting computer program for reading out plural pieces of chord information which are stored in a chord information storage device and which represent a series of chords, and for presenting chords represented by the chord information to a user, wherein the computer program includes the instructions for:
- searching and detecting plural pieces of chord information, representing a first chord progression from among the plural pieces of chord information stored in the chord information storage device, from a chord conversion table;
- inputting a level data representing the degree of difficulty of the first chord progression; and
- converting chord information representing the first chord progression in accordance with conversion information, including a level data representing the degree of difficulty of the first chord progression, stored in the chord conversion table for converting the first chord progression to a second chord progression, so as to present the second chord progression to the user in place of presenting the first chord progression, after when a series of the plural pieces of chord information representing the entirety of the first chord progression is found in the conversion table and the input level data is higher or equal to the level of difficulty of the first chord type stored in the chord conversion table.

* * * * *